July 1, 1930.  R. PORTE  1,769,274
LIQUID MEASURING DEVICE
Filed May 27, 1927  2 Sheets-Sheet 1
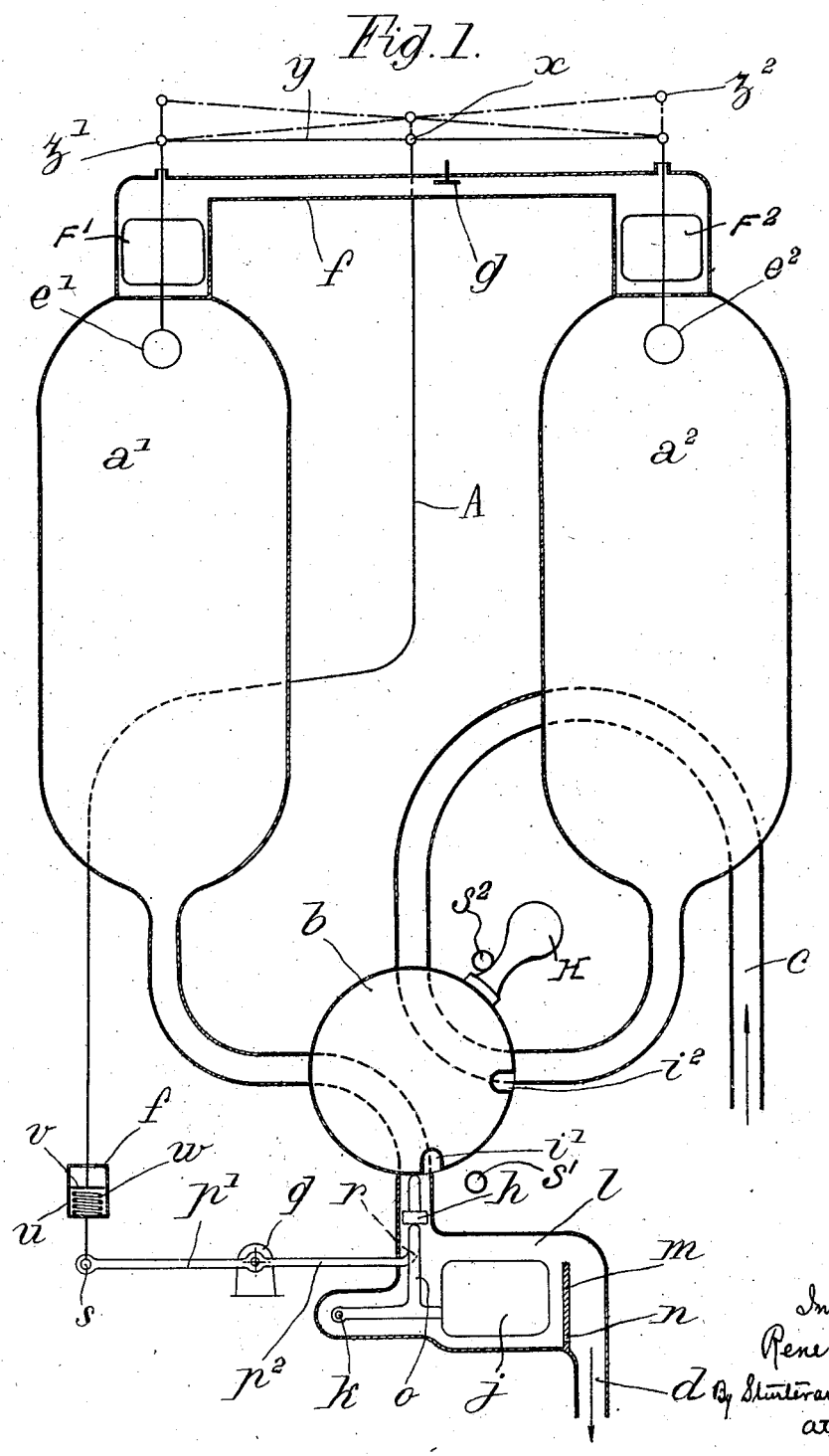

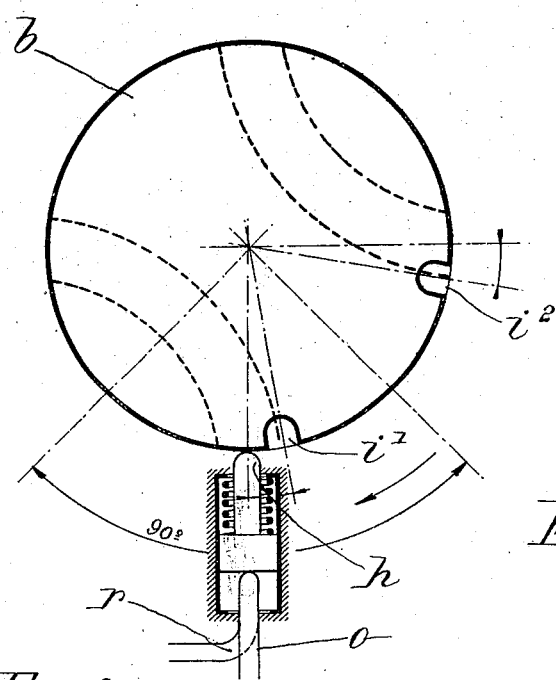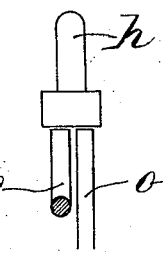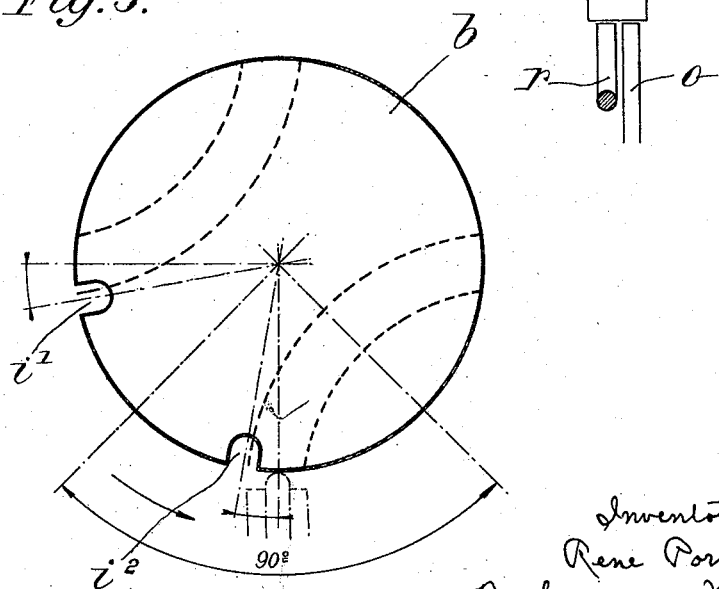

Patented July 1, 1930

1,769,274

UNITED STATES PATENT OFFICE

RENÉ PORTE, OF LEVALLOIS-PERRET, FRANCE, ASSIGNOR TO SOCIETE ANONYME POUR TOUS APPAREILLAGES MECANIQUES, OF LEVALLOIS-PERRET, FRANCE

LIQUID-MEASURING DEVICE

Application filed May 27, 1927, Serial No. 194,676, and in Belgium June 12, 1926.

The present invention relates to liquid measuring devices and more particularly those of the type having a pair of measuring reservoirs arranged to alternately deliver measured quantities of liquid.

One of the objects of the invention is to provide a system of controls which will prevent untimely operation of the valve controlling alternate filling and discharge of the reservoirs.

Further objects will appear in the course of the detailed description which will now be given, reference being had to the accompanying drawings in which:—

Fig. 1 represents, diagrammatically, a section through the apparatus;

Fig. 2 is a diagram of the reversing mechanism at one of its extreme positions;

Fig. 3 is a diagram representing the same mechanism as that shown in Fig. 2 at the opposite extreme position of its operation;

Fig. 4 shows, in detail, the structure of a bolt forming part of the reversing mechanism.

Referring to the various figures of the drawing, there is shown a pair of measuring tanks or reservoirs $a^1$ and $a^2$ arranged to be alternately connected, by means of a 4-way cock $b$, to a feed conduit $c$ and to a delivery conduit $d$. Each reservoir is provided with a float valve $e^1$ or $e^2$ at its upper extremity arranged to seal a corresponding port when the liquid level approaches the top. The reservoirs communicate at their upper ends by means of an air passage or conduit $f$ which is provided with an air valve $g$ arranged to open inwardly in conduit $f$. Valve $b$ is provided with passages terminating on the periphery of the valve at distances of 90° from one another, and is formed with a pair of recesses $i^1$ and $i^2$ situated in the same quadrant and spaced at an angle less than 45° from the radius bisecting the quadrant.

Within delivery conduit $d$ and close to valve $b$, there is provided a float chamber $l$ containing a float $j$ mounted on the end of an arm pivoting on a pin $k$, said arm carrying a finger $o$. A loose bolt $h$ rests on the end of finger $o$ and is formed so as to be able to engage in either one of recesses $i^1$ or $i^2$ formed on the periphery of valve $b$. Chamber $l$ also contains an overflow wall $m$ formed with a small draining orifice $n$ located near the bottom thereof. Bolt $h$ is brought under the control of the overflow floats $e^1$ and $e^2$ by means of an assembly consisting of a finger $r$ mounted on one extremity of a lever $p^1$, $p^2$, pivoted at $q$, a cylinder $u$ articulating with the other extremity of lever $p^1$, $p^2$ at $s$, a piston $v$ moving in cylinder $u$ against the action of spring $w$, a vertically displaceable rod A, and a rod $y$ pivotally connected to A at $x$ and to the rods attached to float valves $e^1$, $e^2$ at $z^1$ and $z^2$. This bolt actuating assembly is designed so that for a given displacement of points $z^1$ and $z^2$, point $x$ moves through a distance equal to the stroke of piston $v$ in cylinder $u$. Spring $w$ is designed so as to be completely decompressed when piston $v$ reaches the upper limit of its stroke i. e. it exerts no pressure on lever $p^1$, $p^2$ (and consequently on bolt $h$) when piston $v$ is in raised position.

If desired, bolt $h$ may be mounted to move upwardly against the action of a spring as shown in Fig. 2. With such an arrangement, the bolt is held away from the periphery of the valve until urged upwardly by either finger $r$ or finger $o$.

The manner in which the apparatus operates is as follows:—Starting with both reservoirs empty, valve $b$ is adjusted to one of its extreme positions which, for the purpose of illustration, will be assumed be the one shown in Fig. 1, i. e. in which reservoir $a^2$ is being filled; the operating handle H of the valve body $b$ is limited in its counterclockwise movement by a stop $S^2$, and in such end or extreme position the valve body $b$ has been rotated counterclockwise slightly beyond the position in which the pin $h$ and the recess $i'$ are opposite each other. In this position, liquid arriving from the feed pump (not shown) or similar mechanism passes through conduit $c$ and continues to fill tank $a^2$ until the float $F^2$ attached to float valve $e^2$ is actuated upward and brings the latter into contact with the corresponding overflow port; during the upward movement of float valve $e^2$, points $z^2$ and $x$ are carried upward and, as a consequence, rod A and piston $v$ move so as to lessen the pressure exerted (1) on spring $w$ and (2), through the intermediary of lever $p^1$, $p^2$ and finger $r$, on bolt $h$. If the handle H be moved before this movement of the float valve and the rod A occurs, the action of the rod A through the spring $w$ will cause the pin $h$ to be raised into the recess $i'$, thus blocking the valve $b$ against further clockwise movement while it has heretofore been prevented from counterclockwise movement by the fixed stop $S^2$. When the rod A is moved upward, however, the pin $h$ is permitted to be lowered, since it has theretofore only been sustained by the end $r$ of the lever $p'$, $p^2$, thus permitting valve $b$ to be rotated, and it may then be turned to the position shown in Fig. 3 wherein tank $a^2$ discharges while tank $a^1$ is placed in communication with feed conduit $c$.

The liquid discharging from tank $a^2$ passes into float chamber $l$ and, accumulating behind wall $m$, raises float $j$ and causes finger $o$ to exert a pressure on bolt $h$ which prevents rotation of valve $b$. By causing this pin $h$ to be raised into engagement with a recess in the valve body $b$, in this instance the recess $i^2$ (Fig. 3), thus preventing any movement of the valve body $b$ so long as the pin $h$ is raised; it will be noted that in the position of Fig. 3, the valve body can only be moved in a counterclockwise direction by the handle $h$, by reason of the fixed stop $S'$. In the meantime tank $a^1$ continues to fill until its float F′ operates the valve $e^1$ and closes the overflow port. If tank $a^2$ has not completely emptied itself, at the time that float valve $e^1$ rises to seal the top of tank $a^1$, float $j$ will continue to push upwardly through the intermediary of finger $o$ against bolt $h$ and any attempt to rotate valve $b$ will result in bolt $h$ entering recess $i^2$ and locking the valve until tank $a^2$ is completely empty. When this occurs, the upward pressure of float $j$ on bolt $h$ will be relaxed, and since, in the meantime, the pressure of finger $r$ will have also relaxed by the upward movement of float valve $e^1$, bolt $h$ will drop out of recess $i^2$ and valve $b$ will be free to rotate back to the position shown in Fig. 1.

From the foregoing it will be seen that with the double control of bolt $h$ from the discharge and overflow ends of the tanks, rotation of valve $b$ is prevented until and unless one tank is completely full and the other is completely empty.

It is to be understood that the invention is not to be taken as limited to manually operated valves but may be applied to systems in which the reversing valve is automatically operated by special reversing mechanisms.

What I claim is:—

1. An apparatus of the class described comprising in combination a pair of tanks, common feed and discharge conduits for said tanks, a manually operable valve interposed between said tanks and said conduits, said valve being operable to alternately fill and discharge each tank, a valve engaging member normally preventing the movement of said valve, independent means for each tank and operated upon the complete filling of the respective tank to effect the release of said valve engaging member, and means operated by the discharged liquid to prevent the release of said member, whereby the movement of said valve is prevented during the filling of either tank except upon the completed filling of the tank, and is prevented during discharge from either tank.

2. An apparatus of the class described comprising in combination a tank, a feed conduit connected to said tank, a float adapted to be raised when the tank is full of liquid, a manually operable valve controlling the feed conduit, and means operated by said float for preventing movement of said last named valve during the course of a filling operation.

3. In an apparatus of the class described, the combination of a tank, a feed conduit connected to said tank, a float in said tank and a connected valve controlling an overflow port in the top of said tank, a manually operable valve controlling the feed conduit, and means actuated by the float valve for preventing movement of the valve controlling the feed conduit throughout the course of a filling operation.

4. In an apparatus of the class described, the combination of a tank, a feed conduit connected to said tank, a float valve controlling the upper level of said tank, a rotatable valve controlling the feed conduit, pressure means adapted to prevent rotation of said rotatable valve, and lever means interposed between the float valve and said pressure member and operable to diminish the pressure on said pressure member when the float valve rises.

5. In an apparatus of the class described, the combination of a tank, a discharge conduit connected to said tank, a valve controlling said discharge conduit, a float operated by liquid in said discharge conduit, a locking device for the valve normally free from engagement with both the valve and float, and means actuated by said float to move said locking device into engagement with said valve, whereby to prevent movement of said valve throughout the course of the discharging operation.

6. In an apparatus of the class described, the combination of a tank, a discharge conduit connected with said tank, a float, means to provide a float chamber communicating with said discharge conduit and containing said float, a rotatable valve controlling said discharge conduit, a latch member normally free from engagement with both the valve and float and adapted, upon engagement with the valve, to prevent rotation of said valve, and means connected to said float for transmitting the movemet thereof to said latch member for moving the same into engagement with the valve.

7. An apparatus of the class described comprising in combination a pair of tanks, common feed and discharge conduits for said tanks, a rotatable valve interposed between said tanks and said conduits, floats and connected valves controlling the upper level of each tank, means operable by said floats to prevent rotation of the rotatable valve when both of said float valves are in the open position, and means associated with the discharge conduit and operated by liquid therein for preventing rotation of the rotatable valve during the period that either tank is discharging.

8. An apparatus of the class described comprising in combination a pair of tanks, a float and a connected valve fitted to each of said tanks and controlling the upper level thereof, a bar pivotally connected to each float, a feed conduit, a discharge conduit, a rotatable valve to alternately connect each conduit to each tank, a latch member adapted to prevent rotation of the rotatable valve when pressure is exerted thereon, float means associated with the discharge conduit and operable to exert pressure on the latch member during discharge of either tank, and means connected to the bar and operable to exert pressure on the latch member when both float valves are in lowered position.

9. An apparatus of the class described comprising in combination a pair of tanks, a float and a connected valve fitted to each tank and controlling the upper level thereof, a bar pivotally connected to each float, a feed conduit, a discharge conduit, a rotatable valve inposed between said feed and discharge conduits and the tanks and operable to alternately connect each conduit to each tank, said rotatable valve having recesses formed therein, a latch member adapted to exert pressure on the periphery of said rotatable valve and formed so as to be engageable in the recesses of the latter, float means associated with the discharge conduit and operable to exert pressure on the latch member during the discharge of either tank, and means connected to the bar and operable to exert latching pressure on the latch member when both float valves are in lowered position.

10. An apparatus of the class described comprising in combination a tank, a feed conduit connected to the bottom of said tank to supply liquid thereto, said tank having an overflow port and conduit at its top, a float in said overflow conduit and adapted to be raised when the tank is full of liquid, a valve connected to said float to close said port, a valve controlling the said conduit, and means operated by said float for preventing the movement of said last named valve during the course of a filling operation.

In testimony whereof I have hereunto set my hand.

RENÉ PORTE.